Figure 1:
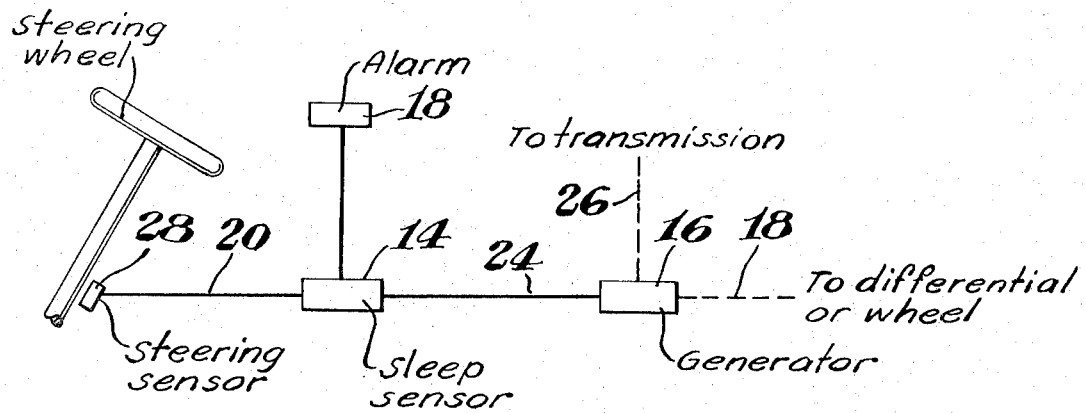

United States Patent

Setser

[15] 3,678,494
[45] July 18, 1972

[54] SLEEP SENSING APPARATUS FOR USE ON AUTOMOTIVE VEHICLES

[72] Inventor: Donald D. Setser, Tulsa, Okla.
[73] Assignee: The Dow Chemical Company, Midland, Mich.
[22] Filed: Feb. 25, 1971
[21] Appl. No.: 118,599

[52] U.S. Cl. .......................................... 340/279, 340/52 R
[51] Int. Cl. ......................................................... G08b 21/00
[58] Field of Search .................... 340/279, 52 R, 54, 52 D

[56] References Cited

UNITED STATES PATENTS 3,026,503  3/1962  Scheer ................................. 340/279
3,594,772  7/1971  Setser .................................. 340/279

*Primary Examiner*—Donald J. Yusko
*Attorney*—Griswold & Burdick and Earl D. Ayers

[57] ABSTRACT

An electrical sensing switch is coupled to the steering mechanism of the vehicle whereby the normal moving of a steering wheel results in frequent movement and actuation of the contacts of the switch.

Actuation of the multi-contact switch depending on movement of the vehicle's steering wheel, results in a cutoff or non-cutoff of a unijunction switch, depending on frequency of actuation of the switch, used to control a silicon controlled rectifier in series with an alarm circuit coupled across a power source. A d.c. generator, coupled to the vehicle drive, provides a bucking voltage whose amplitude is speed dependent for adjusting the operation threshold of the unijunction switch.

Lack of normal steering movement results in the operation of the silicon control rectifier as a spike of energy is received from the unijunction switch, thus sounding the alarm. Alarm resetting is accomplished through a steering wheel movement which grounds a capacitor which is coupled to the silicon controlled rectifier.

4 Claims, 2 Drawing Figures

Patented July 18, 1972

3,678,494

INVENTOR.
Donald D. Setser
BY Earl D. Ayers

AGENT

SLEEP SENSING APPARATUS FOR USE ON AUTOMOTIVE VEHICLES

BACKGROUND OF THE INVENTION

This invention relates to apparatus for detecting sleepiness or drowsiness of the driver of an automotive vehicle and for producing a warning or detection of such sleepiness or drowsiness.

The problem of detecting sleepiness or drowsing in a driver of a motor vehicle has been prevalent since the development of automotive transportation.

Attempts to solve the problem have included foot switches which must be kept activated by pressure applied by the driver's foot, with an alarm sounding when the drowsy driver inadvertently moves his foot. Another device utilizes a set of electrical contacts attached to the eyelids of the driver. Closing of the driver's eyes completes the electrode contacts and actuates an alarm.

The prior art attempts to solve the problem of the sleepy or drowsy driver have had one or more shortcomings.

Either the devices have been attached to the driver or the driver must retain physical contact with the device, and such features are not as acceptable as is desired.

Accordingly, a principal object of this invention is to provide improved apparatus for sensing sleepiness or drowsiness in a driver of a motor vehicle.

A further object of this invention is to provide an improved apparatus for detecting sleepiness or drowsiness of a driver of a motor vehicle in which the apparatus serves the need to remind the driver to be more and more attentive to the vehicle as the vehicle speed increases.

In accordance with this invention there is provided apparatus for sensing drowsiness of an operator of a motor vehicle which includes a multiple contact sensing switch coupled to or actuated by movement of the steering mechanism of the motor vehicle, means including a dual capacitor diode coupled network for biasing a unijunction switch to provide an energy spike to actuate a silicon controlled rectifier connected in series with an alarm across a power source. Biasing of the unijunction switch is also influenced by vehicle speed through the speed variable output of a generator. Resetting of the alarm is accomplished by grounding one side of a capacitor coupled to the silicon controlled rectifier and to the sensing switch as a result of movement of the sensing switch.

Figure 2:
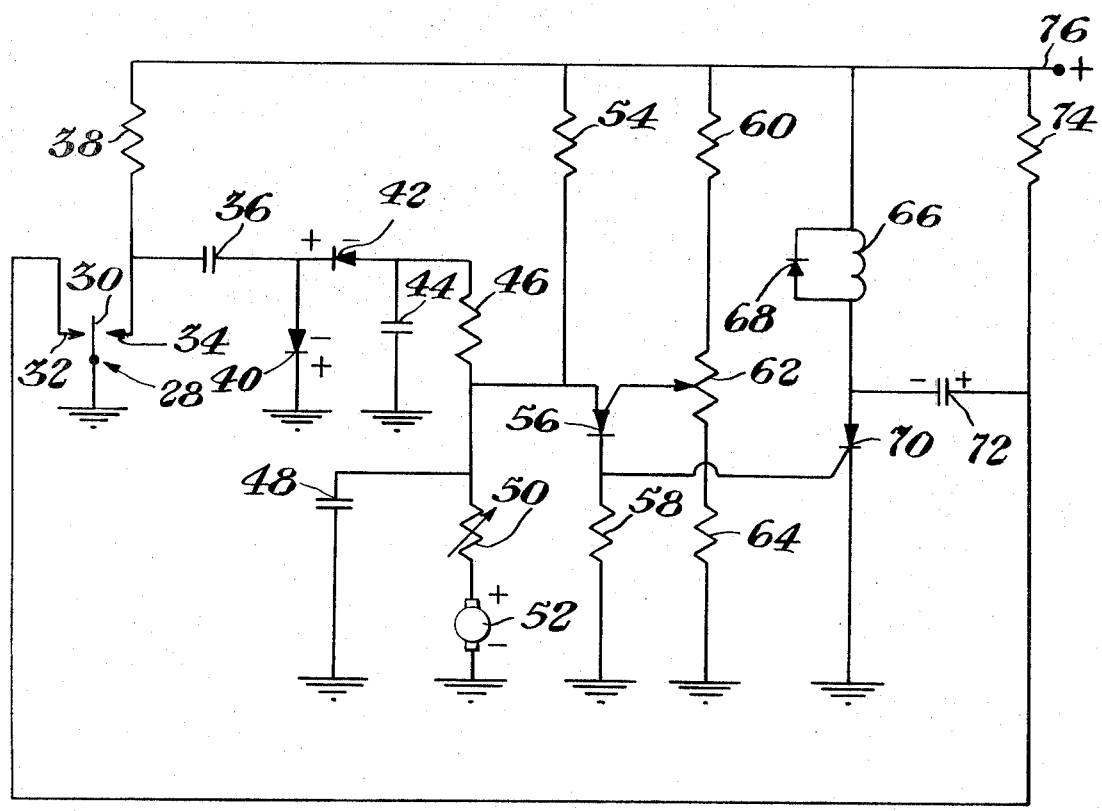

The invention, as well as additional objects and advantages thereof, will best be understood when the following detailed description is read in connection with the accompanying drawing, in which:

FIG. 1 is a diagrammatical view of apparatus in accordance with this invention, and FIG. 2 is a schematic diagram of apparatus in accordance with this invention.

Referring now to the drawings, and particularly to FIG. 1, there is shown steering apparatus 10 for a motor vehicle (not shown) having a steering sensor switch 28 mechanically coupled thereto. The switch 28 is electrically coupled by cable means 20 to a sleep sensor circuit 14 which is coupled to an alarm 18, such as a bell or flashing light, for example. The generator 16 is coupled to the vehicle's transmission or differential by mechanical coupling means 26 or 18 and to the sensor circuit by means 24.

Referring to FIG. 2, a single pole double throw switch 28 is shown with its movable contact 30 grounded and disposed between pole terminals 32, 34. Pole 32 is electrically coupled to one side of capacitor 72 and to one end of resistance 74 which is in turn coupled to the positive terminal 76 of a suitably regulated direct current power supply (not shown).

The terminal 34 is coupled through resistor 38 to the positive terminal 76 and to one side of capacitor 36.

An alarm having a bell winding 66, for example, shunted by a diode 68 is connected in series with a silicon controlled rectifier 70 between the positive terminal 76 and ground. The other side of the capacitor 72 is coupled between the alarm and rectifier 70.

The control electrode of rectifier 70 is coupled to the base of a unijunction switch 56. A resistor 58 is also coupled between the base of switch 56 and ground.

A resistance network composed of series connected fixed resistance 60, variable resistance 62 and fixed resistor 64 are coupled between the positive terminal 76 and ground. The movable contact of variable resistance 62 is coupled to one biasing electrode of the unijunction switch 56.

The other control electrode of the unijunction switch 56 has, in effect, a network of three energization means coupled to it. First, it is connected to the positive terminal 76 through resistor 54. Second, a d.c. generator 52 and variable resistor 50 are connected in series between the said other control electrode and ground, with a filter capacitor 48 being shunted between the top of variable resistance 50 and ground.

The third energization means is capacitor 44, one side of which is grounded and the other side is coupled to said other control electrode through fixed resistor 46.

The ungrounded side of capacitor 44 is coupled to the second side of capacitor 36 through a diode 42 (whose base side is coupled to the capacitor 36).

A diode 40 is coupled between the junction of diode 42 and the capacitor 36 and ground, its base being the grounded element.

In operation, when switch 28 is in the open position as shown, capacitor 36 is charged through resistor 38. As switch 28 is moved and makes contact at 34 the charge on capacitor 36 is transferred through the diodes 40 and 42 onto capacitor 44. Frequent action of the switch 28 in this manner will cause the voltage to build up on capacitor 44 until unijunction switch 56 allows voltage of opposite polarity to that being built up on 44 to cancel out part of the charge on capacitor 44.

If the voltage applied to bias the unijunction switch 56 from the capacitor 44, through resistance 54 and from the generator 52 reaches the value required to switch the unijunction switch 56 it will switch and cause a pulse to appear on the gate or control electrode of the silicon controlled rectifier 70. As the speed of the motor vehicle increases, increasing the speed of generator 52, the output of generator 52 increases and decreases the time necessary to reach the value required to switch the unijunction switch 56.

The pulse will cause rectifier 70 to conduct because the pulse from the switch 56 is of proper polarity and amplitude to cause conduction through rectifier 70.

This will allow current to flow through alarm 66 which will awake the vehicle driver. When switch 28 connects to contact 32 capacitor 74 will be grounded. This will cause the rectifier 70 return to a non-conducting state. This resetting action continues during each steering action even when the rectifier 70 is non-conducting. Variable resistor 62 is adjusted so that unijunction switch 56 will conduct only when the predetermined speed of the vehicle (evidenced by the output of generator 52) has been reached. Variable resistor 50 is adjusted so as to determine the time delay between non-steering action and alarm by limiting the amount and rate of bucking voltage from the generator 52 attached to speedometer to overcome the bias voltage on capacitor 44. The diode 68 is used as a transient voltage suppressor to prevent a voltage "-spike" occurring when the alarm coil 66 has its current cut off by the rectifier 70.

Thus, unless the movement of the steering wheel frequently moves the contact 30 of switch 28 to contact 34 and thus in a pulsed manner repetitively transfer part of the charge on capacitor 36 to capacitor 44, the unijunction switch will lose its bias and switch to provide a spike pulse to cause the silicon controlled rectifier to conduct and cause actuation of the alarm 66.

Therefore, if the vehicle driver falls asleep with the contacts of the switch remaining in any one position, the alarm will sound.

What is claimed is:

1. Apparatus for providing a warning when the driver of a motor vehicle becomes drowsy or falls asleep while driving, comprising:

A. an electrical switch coupled to steering apparatus of a motor vehicle or the like, said switch being of the single pole double throw type, the coupling to said steering apparatus being such that a small movement of the steering apparatus moves the pole of the switch from one throw to the other, the single pole of said switch being grounded, B. an alarm circuit including an alarm device connected in series with a silicon controlled rectifier and adapted to be connected across the terminals of a suitably regulated direct current source, the negative terminal being grounded, a series connected capacitor and resistance being coupled between the positive terminal of said direct current source and the junction between said alarm and rectifier;

C. a programmable unijunction switch, said switch having a programming element coupled to a voltage dividing network effectively coupled across said alarm circuit, the base of the unijunction switch being grounded through a resistance element and being directly coupled to the gate of said silicon controlled rectifier and the other element of said unijunction switch being coupled through a resistance across said direct current source, through a variable resistance to the positive terminal of a grounded direct current generator, a capacitor-diode network for supplying a negative potential through a resistance element, one throw of said switch being coupled to said capacitor-diode network and to the positive side of said direct current source and the other throw of said switch being coupled to the junction between the series connected capacitor and resistance which are connected between the positive terminal of said direct current source and the junction between said alarm and said rectifier.

2. Apparatus in accordance with claim 1, wherein the output of said generator is a function of the speed of the vehicle.

3. Apparatus in accordance with claim 1, wherein said capacitor- diode network comprises a first capacitor coupled on one side to said one throw of said switch and a second capacitor grounded on one side and coupled to the other side to the second side of said first capacitor through a first diode, the positive side of the diode being coupled to the second side of said first capacitor, and a second diode coupled between the junction of said first diode and said first capacitor and ground, with the positive side of said diode being grounded, said resistance element coupling said network to said unijunction switch being coupled to the ungrounded side of said second capacitor.

4. Apparatus in accordance with claim 1, wherein a transient voltage suppression device is coupled across said alarm device.

* * * * *